United States Patent [19]

Walter et al.

[11] 3,813,133
[45] May 28, 1974

[54] AXIAL THRUST BEARING

[75] Inventors: Lothar Walter, Schweinfurt; Rainer Schurger, Arnstein, both of Germany

[73] Assignee: SKF Industrial Trading and Development Company N.V., Amsterdam, Netherlands

[22] Filed: Aug. 4, 1972

[21] Appl. No.: 277,984

[30] Foreign Application Priority Data
Aug. 9, 1971 Germany............................ 2139768

[52] U.S. Cl. .................................................. 308/9
[51] Int. Cl. ............................................ F16c 17/16
[58] Field of Search ........................................ 308/9

[56] References Cited
UNITED STATES PATENTS
974,392  11/1910  Junggren ................................ 308/9
2,684,272  12/1954  Annen ..................................... 308/9
2,854,298  9/1958  Boumeister ............................. 308/9
2,915,902  12/1959  Brugger .................................. 308/9

FOREIGN PATENTS OR APPLICATIONS
895,328  5/1962  Great Britain .......................... 308/9

Primary Examiner—Charles J. Myhre
Assistant Examiner—Frank Susko
Attorney, Agent, or Firm—Murray Schaffer

[57] ABSTRACT

A thrust bearing comprising a bushing having a bottom, a cylindrical axially extending wall in which a shaft is received. The bushing is provided with an opening for pressurized fluid to bear on the frontal end of the shaft to form a pressure cushion. The wall of the bushing has a diameter larger than the shaft to provide an annular clearance over the length of the wall to increase the effective pressure cushion area.

10 Claims, 2 Drawing Figures

AXIAL THRUST BEARING

BACKGROUND OF THE INVENTION

The present invention relates to a hydrostatic axial thrust bearing and in particular to a bearing for journalling a shaft by supporting its frontal end in a hydraulic pressure cushion.

Hydrostatic bearings of this type are well known, for example reference can be made to German Patent Publication DOS 1,575,389. FIG. 1 of this publication in particular, shows the current state of the art in this field. The known hydrostatic axial thrust bearings are formed with a massive, essentially cylindrical bushing which is worked in its bottom wall to form a pocket in which the hydraulic fluid or lubricant is received, and from which the fluid flows radially outward under pressure. The pocket is made by machining the interior of the bushing. Such machining or working of the bushing is comparatively expensive and time consuming, and therefore the finished product is rather costly. Furthermore, the axial bearing capacity of the conventional device is severely limited, since it depends upon the surface of the lubricant pocket which is smaller than the frontal end surface of the journalled shaft. Thus the pressure cushion extended on the frontal end of the shaft is smaller than the surface of the end and not fully effective.

It is an object of the present invention to provide an axial thrust bearing for a shaft which overcomes the disadvantages of the conventional devices.

It is an object of the present invention to provide an axial thrust bearing for supporting a shaft which is simpler to construct and which is less expensive.

It is another object of the present invention to provide an axial thrust bearing which has greater load bearing capacity for axially supporting a shaft than is known in the prior art.

These object, others and numerous advantages will be seen from the following disclosure of the present invention.

SUMMARY OF THE INVENTION

According to the present invention an axial hydraulic thrust bearing is provided for supporting the end of a rotating or axially movable shaft or the like. The thrust bearing comprises a bushing having a bottom and an axially extending cylindrical wall in which the shaft is inserted. An opening is provided by which pressurized fluid is received to bear against the frontal end of the shaft. The cylindrical wall of the bushing is formed with a diameter greater than the shaft to provide an annular clearance thereabout over the length of the wall. In this manner a pressure cushion having an increased effective load bearing surface, at least comparable to the frontal end of the shaft, is provided.

As a result of this construction, the entire area at the frontal end of the shaft is employed to fashion the pressure cushion, providing a significant increase in supporting capacity. Further, unlike the prior bearings of this type no lubricant pocket has to be machined, nor do the bridging or web conduit members by which the fluid is radially removed have to be formed. The loss in effective bearing surface caused by these members is obviated in the present invention.

In the present device, the fluid flows through an axial slit or clearance, completely surrounding the shaft end and provides additional fluid bearing support for the shaft in the radial direction.

Preferably, the bearing bushing is formed from thin material such as sheet metal or plastic and is formed by stamping or drawing the material in a simple and conventional manner. If synthetics are used, the bushing may be molded. Thus the finishing of the bushing is both simple and very inexpensive.

In further accord with the present invention, the bushing is sized and calibrated by the insertion of a flat disk, adapted to rest on the bottom of the bushing. The disk is provided with a diameter slightly larger than the bushing and preselected with regard to the diameter of the shaft to distend or open the bushing diameter to provide the annular clearance about the shaft end. The disk is preferably force or press fit within the bushing and is replacable at will. An advantage of the construction lies also in the fact that strict manufacturing tolerances need not be observed.

Full details of the present invention are given in the following disclosure and are shown in the accompanying drawings.

BRIEF DESCRIPTION OF DRAWINGS

In the drawing:

As seen in FIG. 1, the hydrostatic thrust bearing of the present invention comprises a cylindrical cup shaped bushing 1. The bushing 1 may be formed from suitable sheet metal, which is preferably pressed or deep drawn in conventional manner to provide a bottom and a cylindrical axially extending side wall. Force fit within the bushing 1 is a circular disk 2, which is inserted so as to rest and lie adjacent to the bottom wall 3 of the bushing. The end of shaft 4 is inserted within the bushing. The diameter of the disk 2 is slightly larger than the inner diameter of the bushing 1 and also of the shaft 4 which is inserted therein, so that it will rotate about the central axis. On insertion of the disk 2 within the bushing 1 the bushing is slightly enlarged and calibrated with respect to the diameter of the shaft 4 to provide a defined annular clearance space s about the shaft. The size of the clearance s may be varied by changing the disk 2 for one of a different diameter. The preselection of the appropriate disk will of course be made taking into account the various operating factors of the thrust bearing and the low characteristics of the fluid through the space. This disk may be metallic, or synthetic plastic, of sufficient width to reinforce the bottom of the bushing and support the cylindrical wall against the varying pressures of operation.

Figure 1:
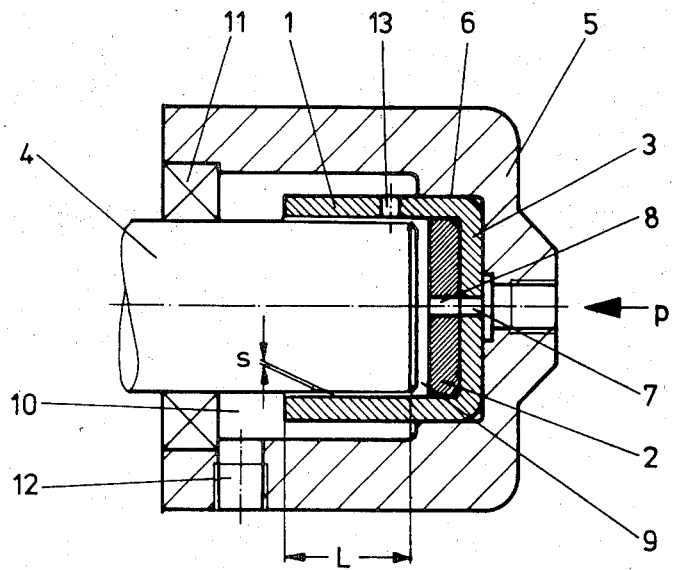
FIG. 1 is a sectional view along an axial plane through the center of a thrust bearing according to the present invention, showing the journalled shaft in place.

The bushing 1 is set within an enlarged cup shaped housing 5 which is provided with a concentric narrow bore 6 at its rearward end, to receive the bushing 1 also in force fit. The remainder of the housing has an inner diameter greater than that of the outer diameter of the bushing. The housing is provided with a central inlet port, and both the bottom wall 3 of the bushing and the disk 2 are provided with holes 7 and 8 respectively axially aligned with the inlet port. The inlet port is adapted to be connected to a supply of hydraulic fluid under pressure, such as a pump reservoir, accumulator or similar conventional means. The shaft 4 is set in the bushing to provide a space 9, in which the pressure cushion is formed, between its frontal end and the face of the disk, which communicates via the annular space s with a space 10 defined by the housing 5. The space 10 is enclosed by a ring or annular seal 11 to form a collecting chamber for the pressurized fluid. An outlet port 12 is provided leading radially from the space 10 to a receiver or to the source of fluid. Lastly, the free end of the bushing 1 is provided with one or more radial bores 13 leading directly to the space 10. The bores 13 are arranged along the length of the wall beyond the point where the bushing is retained by the housing.

As seen in FIG. 1 a large pressure cushion is formed between the frontal end face of the shaft 4 and the bottom of the bushing. This cushion is defined by the space 9, and encompasses the entire end of the shaft. Under axial loading and sliding of the shaft 4 the cushion pressure is continuously self-stabilizing in that the hydraulic fluid within the space 9 flows via the annular space s into the collecting chamber 10, so that the shock and force of the axial movement can be absorbed. The arrangement employing the radial bore 13 is most beneficial when the shaft 4 is journalled on only one axial side, since here wide fluctuation in load on the shaft 4 cause the shaft to slide and move over a greater distance as the shaft is not supported at the opposite end. The bore 13 placed to communicate directly between the spaces 9 and 10 permits the hydraulic pressurized fluid to flow freely between the spaces so that the bearing can be self-stabilizing even under extreme load conditions.

The described and shown bearing support is simple and easily built. It is not necessary to follow close or exacting tolerances in forming the various parts. Any inaccuracy in the inner diameter of bushing 1, and thereby the annular space s is compensated for and averaged out over the relatively long length L between the end of the shaft 4 and the lip of the bushing 1 through which the fluid flows.

Figure 2:
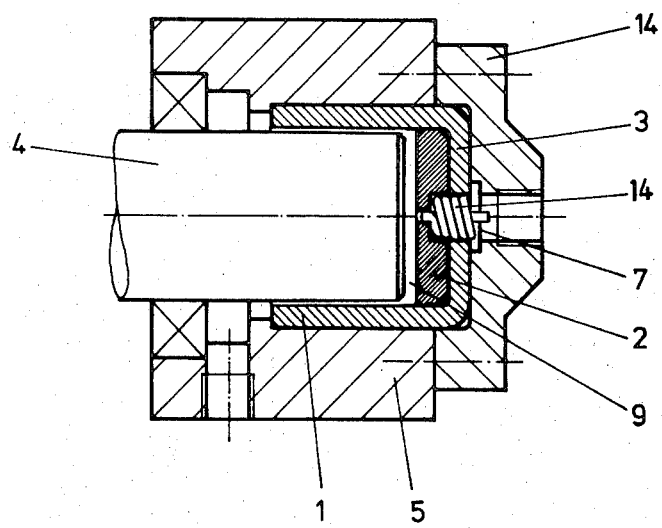
FIG. 2 is a view similar to, but showing a modification of the structure of FIG. 1.

The embodiment seen in FIG. 2 is very similar to that of FIG. 1 except that the bushing 1 is force fit over its entire length within the housing; the collecting space 10 is shortened and the inner bore 6 extended. Further, the housing is made in two parts, namely a cylindrical portion 5' and a cover member 14 which is separable therefrom. The inlet port is at the center of the cover 14, which itself has an annular flange or skirt which envelopes the bottom wall 3 of the bushing. Also the hole 7 in the bottom wall 3 of the bushing and a portion of the hole 8 are of enlarged diameter, compared with those in FIG. 1, so that in the enlarged holes a throttle or valve 14 may be inserted. The throttle or valve suitable for this construction are conventional and need not be further described. The construction seen in FIG. 2 is suitable for journalling the shaft at both ends and therefore the radial stabilizing and equalization bore 13 may be eliminated as is seen in the drawing.

As in the embodiment of FIG. 1, that of FIG. 2 is also simple to construct and very economical. Manufacturing tolerance may be very crude, and through the force fit of disk 2 in the bushing 1 the simultaneous calibration of the bearing is obtained, and any inaccuracies in the depth etc. of the space s is equalized over a similarly long axial flow space L. Thus the requirements for driving the shaft may be varied over a wide range. In both instances the hydraulic pressure is exerted in largest part against the frontal end face of the shaft 4 so that a large pressure cushion is formed having a maximum effective bearing surface capable of absorbing high axial loads. The effective bearing surface of the pressure cushion is comparable to that of the frontal face and at least equal to it.

The fluid may be conventional hydraulic media, lubricant oil or similar fluids employed in axial thrust bearings.

Various modifications and changes can be made. For example, the bushing can be made by machining a metal piece or by some other conventional means. Also it may be preferable under certain conditions to make the bushing from low friction, self-lubricating materials, such as nylon or the like, so that the bearing could also take up and absorb radial forces as well.

The present disclosure is illustrative only and should not be taken as limiting of the present invention.

What is claimed is:

1. A hydrostatic axial thrust bearing for supporting the end of a shaft or the like comprising a cylindrical bearing bushing for receiving a shaft, said bushing being formed of thin-walled material having a bottom and an axially extending wall, an aperture formed in said bottom for receiving pressurized fluid to form a pressure cushion between said bottom and the frontal end of a shaft received in said bushing having an effective bearing surface corresponding to that of the shaft, the axial wall of said bushing having a diameter slightly greater than said shaft to provide an annular clearance thereabout uninterrupted over the axial length of said wall to provide a relatively large axial annularly restricted outflow conduit for the pressurized media about the shaft inserted therein, creating a hydrostatic pressuring in said bearing cushion.

2. The thrust bearing according to claim 1 including an outer housing, said bushing being retained in said housing and defining therewith an annular chamber about said bushing, said annular clearance between said shaft and said bushing communicating between the frontal end of said shaft and said chamber.

3. The thrust bearing according to claim 1 including a wall disk arranged on the bottom of said cylindrical bushing.

4. The thrust bearing according to claim 3 wherein the outer diameter of the disk is greater than that of the shaft.

5. The thrust bearing according to claim 4 wherein the outer diameter of the disk is greater than the inner diameter of the bushing and is force fit therein.

6. The thrust bearing according to claim 3 wherein said disk and the bottom of the bushing are provided with coaxial openings for receiving fluid under pressure.

7. The thrust bearing according to claim 6 including valve means arranged within the opening for receiving said fluid.

8. The thrust bearing according to claim 2 including at least one radial opening in the wall of said bushing communicating directly with the annular chamber of said housing.

9. The thrust bearing according to claim 2 including an outlet port extending from said chamber.

10. The thrust bearing according to claim 2 including seal means for sealing said housing about said said shaft.

* * * * *